United States Patent [19]

Thomas

[11] Patent Number: 4,744,841
[45] Date of Patent: May 17, 1988

[54] APPARATUS AND METHOD FOR REPAIRING GLASS BODIES

[76] Inventor: Thomas L. Thomas, 190 W. 1700 North, Centerville, Utah 84014

[21] Appl. No.: 854,002

[22] Filed: Apr. 21, 1986

[51] Int. Cl.$^4$ ............................ B32B 31/16; B32B 35/00
[52] U.S. Cl. ................................. 156/73.6; 156/94; 156/98; 264/36; 264/69; 425/13
[58] Field of Search ............... 156/73.6, 94, 580.1, 156/98; 264/36, 69; 425/13

[56] References Cited

U.S. PATENT DOCUMENTS 3,562,366  2/1971  Sohl .............................. 264/36 X
3,841,932  10/1974  Forler et al. ........................ 156/94

Primary Examiner—Robert A. Dawson
Attorney, Agent, or Firm—B. Deon Criddle

[57] ABSTRACT

A method of repairing windshields that have been chipped or cracked comprising the steps of removing damaged glass from a break in the surface of the glass, fixing a pressure applier over the break, impact vibrating the windshield and heating the reverse side of the windshield to increase the size of the opening being filled and to drive air from the opening, injecting a resin into the damaged area while vibrating and heating and, if necessary, removing any additional air by developing a suction over the damaged area. The apparatus of the invention includes a frame that is suction held in place, and that mounts the injection plunger and a vibrator to vibrate the glass as a resin is injected into openings in the glass.

7 Claims, 1 Drawing Sheet

APPARATUS AND METHOD FOR REPAIRING GLASS BODIES

FIELD OF THE INVENTION

This invention relates to a method of glass body repair and apparatus to use with glass bodies.

PRIOR ART

For some time it has been recognized that resins can be used to repair small chips, breaks and cracks in windshields of vehicles. The repairs are made to provide a maximum effective visibility through the glass and to the extent possible, restore the structural integrity of the windshield.

U.S. Pat. Nos. 3,993,520 and 4,200,478, for example, disclose apparatus and methods for repairing windshields. Both of the aforementioned patents recognize that a resin may be forcibly injected into a break in the glass of a windshield and that suction may then be used to remove air from the resin. Other methods of windshield repair are illustrated by U.S. Pat. Nos. 3,765,975 and 3,652,366. Also U.S. Pat. No. 3,562,366 discloses a method of sealing cracks in a windshield using ultrasonic vibrations to vibrate the area to cause filling of the open portion of the crack with a resin.

U.S. Pat. No. 3,765,975 relates to filling windshield bulls-eye or pock mark cracks, with a resin without the use of vibrations, but including the use of a probe that mechanically pushes a broken portion of glass away from the crack area so that the crack will fill, and then subsequently subjecting the area-to alternate negative and low positive pressures within a controlled temperature range.

It has been found however, that the mere injection of a resin, even using vibration, into a break and the evacuation of air from the injected resin does not always provide for complete filling of the break or removal of all air trapped in the resin used. Consequently, the resin, when it hardens, may result in refraction differences between the body of resin and adjacent glass edges and within the resin body, where air bubbles, however, small, may remain.

OBJECTS OF THE INVENTION

Principal objects of the present invention are to provide method and apparatus for repairing breaks in windshields or other glass bodies, such as plate glass, to have maximum filling of the break with resin and maximum removal of air from the resin used in making the repairs.

Other objects are to provide apparatus that can be used with glass bodies to repair cracks therein and that can also be used as a clamping structure for molding placed around the glass of the body.

Still other objects are to provide a method and apparatus that can be readily employed, even by relatively unskilled persons having a minimum amount of training in the use of the apparatus.

FEATURES OF THE INVENTION

Principal features of the apparatus of the invention include a frame carrying a suction foot, means to secure the foot to a glass body to hold the frame in position, an injection syringe for injecting resin and for creating a vacuum and a vibrator carried by the frame to vibrate the windshield. The suction foot is offset from the line connecting the injection syringe tip and vibrator tip, thereby permitting the tips to be used as clamps to secure windshield molding in place. In alternate embodiments, other pressure feed systems such as a balloon with resin therein can be used to inject resin or the resin can be injected by an electrically or magneticaly attracted piston travelled in a housing and forcing the resin into a broken area.

The method of repairing a glass body of the invention includes the steps of cleaning out the break by picking and/or suction to remove all damaged glass, vibrating the windshield while heating the windshield to enlarge the break (without extending the break size) injecting a resin into the enlarged and heated break and then permitting the break to contract back after filling and air evacuation.

Other objects and features of the invention will become apparent from the following detailed description and drawing disclosing what are presently contemplated as being the best modes of the invention.

THE DRAWING

In the drawing:

FIG. 1 is a top plan view of an apparatus for use with glass bodies of the invention;

FIG. 2, a side elevation view; and

FIG. 3, a fragmentary vertical section view showing another embodiment of the invention as used on a glass body.

DETAILED DESCRIPTION

Figure 1:
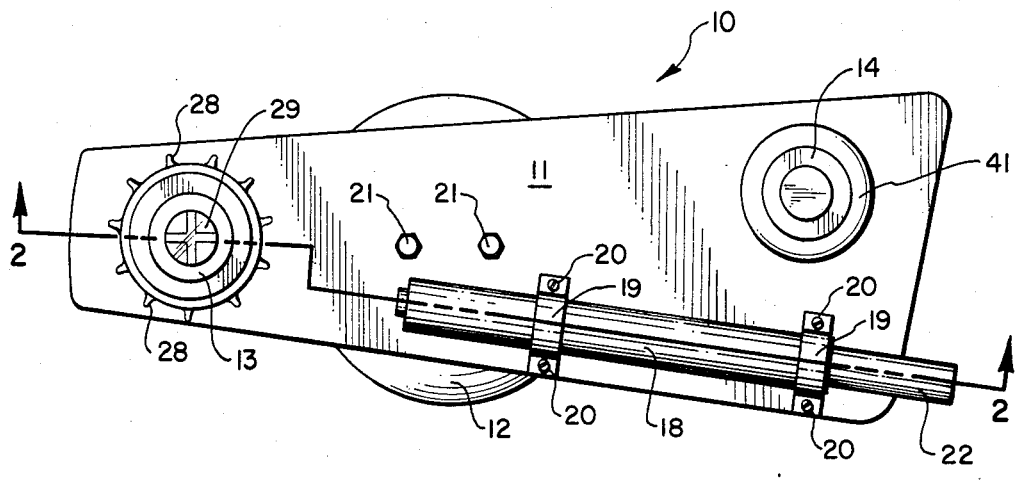
Figure 2:
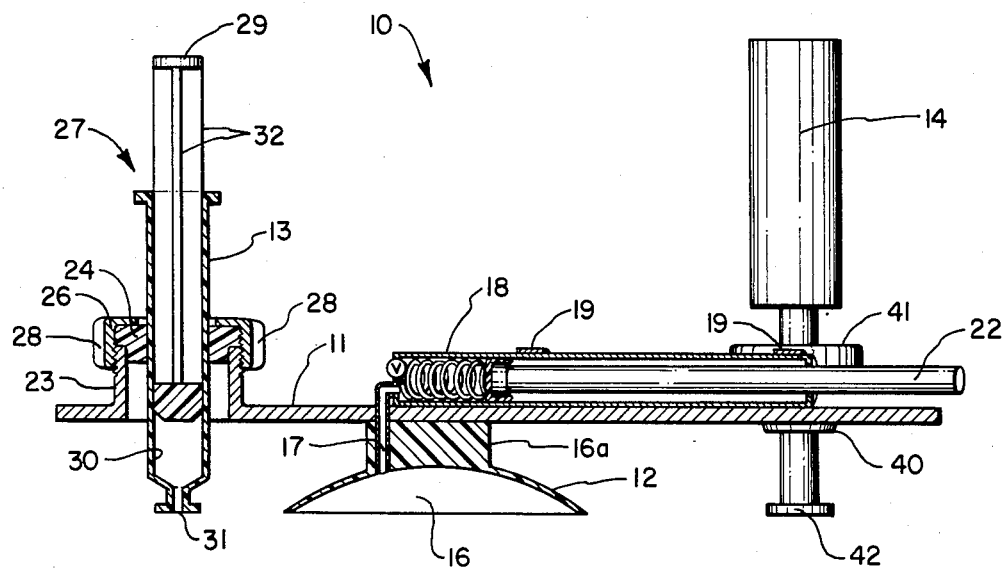

Referring now to the drawing:

In the illustrated preferred embodiment, the apparatus of the invention shown generally at 10, comprises a frame 11, and a suction foot 12 that will secure the frame, in place, on a windshield, or other glass body. An injection syringe 13 is carried by the frame and is used to inject resinous material into openings in the glass and a vibrator 14, carried by the frame, includes a vibrator tip 15 that engages the windshield to vibrate it before, during and after injection of the resin.

The suction foot 12 includes a suction cup 16 that is adapted to rest on a windshield having a hole therein to be repaired and a resilient neck 16a extending from the convex side of the suction cup. The interior (concave side) of the suction cup is connected by a tube 17 that extends through neck 16a into a cylinder 18 that is secured to frame 11 by a bracket 19. Bracket 19 fits over the cylinder 18 and screws 20 pass through ears on the bracket 19 that are threaded into the frame 11. Screws 21 extend through the frame 11 and are threaded into inserts in the suction cup to hold the suction cup to the frame.

A biased plunger 22 extends into cylinder 18 and pumping of the plunger in and out of the cylinder in conventional fashion, will reduce the air pressure inside the suction cup when the suction cup rim is sealed against a windshield. Outside atmospheric pressure will then cause the suction cup to be held securely against the windshield to immobilize the frame 11.

An exteriorly threaded boss 23 is formed to surround an opening through the frame 11 and to project upwardly therefrom and a resilient collar 24 fits partially into the top of boss 23 and projects upwardly therefrom.

An interiorly threaded cap 26 fits over the collar 24 and will, when threaded onto the boss 23, compress the collar 24 around a hypodermic-type syringe 27 inserted through the collar and boss. Handles 28 extend from cap 26 to facilitate turning thereof The syringe 27 used is preferably of conventional disposable configuration having a plastic plunger 29, a barrel 30 and a tip 31. In use, the barrel is positioned in the boss 23 such that the tip 23 is positioned directly over a hole in the glass to be filled. The cap 26 is threaded onto the boss 23 to compress the collar 24 around the syringe and to hold the syringe in place. Partial withdrawal of the plunger which is preferably made of plastic and that includes spaced ribs 32 will create a negative pressure in the chamber above the opening in the glass. This causes air in the opening to be evacuated, as will be further explained. The plunger can be held in its partially withdrawn condition by cutting into a rib 32 with a razor blade, or the like, with the blade resting on the of the cap 26.

The vibrator 14 shown is of standard battery powered configuration, and is secured to the frame 11 by insertion of the vibrator shaft 40 and shaft housing 41 through a boss 40 formed on the frame. A resilient collar 41 and cap 42 threaded onto the boss holds the vibrator in place. The shaft is positioned to extend through the frame 11 such that the tip thereof will engage the windshield and is adjustably positioned by use of cap 42 Thus, operating of the vibrator will cause the tip to repeatably impact against and to vibrate the windshield.

In practicing the glass repair method of the invention all loose particles are carefully picked from the crack, hole or other opening to be repaired in the windshield (or other glass body to be repaired).

The apparatus 10 is placed on the windshield with the tip of the syringe directly over the area to be repaired and with the plunger removed. The suction foot is operated to secure the apparatus to the windshield and the three point contact, i.e. syringe tip, suction foot and vibrator tip, provides a stable mounting for the apparatus 10. Since the extent to which the plunger tip and vibrator tip extend through the frame are adjustable, and since the neck 16a of the suction cup is resilient the frame can be tilted, using suction cups as a fulcrum to accomodate windshield contours, while still maintaining the three point contact.

Several drops of resin are placed in the syringe barrel and the vibrator is turned on to begin vibration of the glass. Heat is applied to the back surface of the glass, as by use of a cigarette lighter and the combination of heat and vibration moves resin into the broken area while at the same time expanding the opening to remove the resin.

The plunger is inserted into the barrel and a slight pressure is applied to further force resin into the broken area and particularly into runner cracks extending outwardly from a central broken area.

If air pockets still exist in the resin after the heating, vibration and pressure application with the plunger, the plunger may be removed, a small diameter wire may be inserted into the barrel and the plunger may be reinserted, and used to again apply pressure. The wire extending along the plunger and past the piston on the plunger will allow air to bleed out past the piston. The wire may then be removed, and the plunger may be partially withdrawn and locked with a razor blade, as previously described to maintain a negative pressure in the barrel that will draw in any air remaining in the break.

Figure 3:
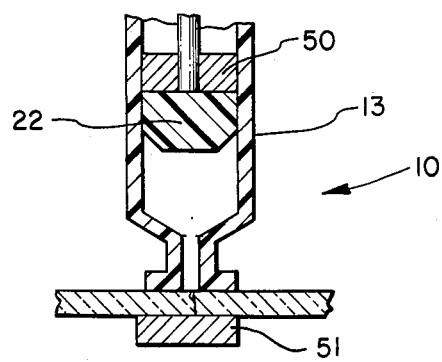

In the embodiment of FIG. 3, a magnet 50 is positioned in the piston of plunger 22 of the syringe 13.

Another magnet 51 having opposite polarity to magnet 50 is positioned on the side of the windshield opposite the apparatus 10 and magnet 51 will attract the plunger 22 to force the resin from the barrel into openings in the glass. Consequently, the user does not have to apply pressure and the magnet 51 can be positioned from the side of the windshield opposite apparatus 10 at the same time heat is applied to the windshield. The heat, of course, both expands the openings and reduces the viscosity of the resin used to insure better flowing into the cracks.

When the apparatus is used as a clamp the suction foot is secured to the glass in the manner described, with the syringe tip and vibrator tip on top of the molding to be held in place.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A method of repairing glass comprising the steps of
   picking loose glass particles from a glass break in the surface of glass body such as a windshield or the like;
   positioning a pressure applier over the break and fixing said pressure applier to the surface of the glass;
   injecting resin through the pressure applier into the glas break while simultaneously vibrating and heating the glass body surface; and
   discontinuing heating and vibrating of the glass and removing the pressure applier from the glass body.

2. Apparatus for use with glass bodies in repairing breaks therein and securing molding applied thereto while said molding is adhesively bonded comprising
   a frame;
   means mounting a syringe to have the tip extend through the frame and from an undersurface thereof;
   means mounting a vibrator to have a tip thereof extend through the frame and from the undersurface thereof; and
   a suction foot including a suction cup projecting from the undersurface of the frame and offset from a line between the tip of the syringe and the tip of the vibrator and including means to create a vacuum in the suction cup.

3. Apparatus as in claim 2, wherein
   the means mounting the syringe and the means mounting the vibrator provide for adjustable positioning thereof through the frame.

4. Apparatus as in claim 3, wherein the syringe has a plastic shaft that can be immobilized with a blade cut thereinto.

5. Apparatus as in claim 4, wherein
   the means for creating a suction in the suction cup comprises a vacuum pump connected to the interior of the suction cup.

6. Apparatus as in claim 2, wherein
   the syringe has a piston therein and a plunger extending therefrom to be used to push the piston and manually eject resin from the syringe into the break.

7. Apparatus as in claim 2, wherein the syringe has a piston therein, said piston being a magnetic metal and further including another magnet to be placed on the glass body at the face thereof opposite the break to attract the piston and to thereby force resin in the syringe into the break.

* * * * *